US00RE41094E

(19) United States
(12) Reissued Patent
Chung et al.

(10) Patent Number: US RE41,094 E
(45) Date of Reissued Patent: Feb. 2, 2010

(54) CCD SCANNER POWERED BY A SERIAL BUS

(76) Inventors: Ching-Fu Chung, Floor 3, No. 22 Lane 35 Zhaguang Rd., Hsinchu City 300 (TW); Yu-Wen Lee, No. 685, Zhonghua Rd., Miaoli City, Miaoli County 360 (TW)

(21) Appl. No.: 11/390,538

(22) Filed: Mar. 23, 2006

Related U.S. Patent Documents

Reissue of:
(64) Patent No.: 6,710,899
Issued: Mar. 23, 2004
Appl. No.: 09/683,957
Filed: Mar. 6, 2002

(30) Foreign Application Priority Data

May 31, 2001 (TW) ..... 90113266

(51) Int. Cl.
*H04N 1/04* (2006.01)

(52) U.S. Cl. ..... 358/475; 358/497; 358/474; 358/483; 358/442; 358/471

(58) Field of Classification Search ..... 358/497, 358/474, 494, 471, 442, 475, 487, 505, 506, 358/509, 483, 482, 512–514; 250/234–236, 250/216, 208.1; 318/685, 696; 382/312, 318, 382/319
See application file for complete search history.

(56) References Cited

U.S. PATENT DOCUMENTS 6,459,506 B1 * 10/2002 Hu et al. ..... 358/473
6,465,987 B1 * 10/2002 Haas et al.

FOREIGN PATENT DOCUMENTS

TW 87104814 * 3/1998

* cited by examiner

*Primary Examiner*—Cheukfan Lee
(74) *Attorney, Agent, or Firm*—Perkins Coie LLP

(57) ABSTRACT

A scanner has a scanning module for generating image data by way of scanning a document, a motor for driving the scanning module, and a control circuit electrically connected to the scanning module and the motor for controlling operations of the scanner. The scanning module has a light source for illuminating the document and a charge coupled device (CCD) for detecting reflected light from the document so as to generate the image data. The scanner is powered only by a serial bus.

31 Claims, 7 Drawing Sheets

CCD SCANNER POWERED BY A SERIAL BUS

Matter enclosed in heavy brackets [ ] appears in the original patent but forms no part of this reissue specification; matter printed in italics indicates the additions made by reissue.

BACKGROUND OF INVENTION

1. Field of the Invention

The present invention relates to a scanner, and more specifically, to a charge coupled device (CCD) scanner powered by a serial bus.

2. Description of the Prior Art

Please refer to FIG. 1 and FIG. 2. FIG. 1 is a schematic view of a charge coupled device (CCD) scanner 10 electrically connected to both a universal serial bus (USB) 30 and an external power source 20 according to the prior art. FIG. 2 is a function block diagram of the scanner 10 in FIG. 1. The scanner 10 includes a scanning module 14 for generating image data by way of scanning a document 12, a motor 22 for driving the scanning module 14, and a control circuit 24 for controlling operations of the scanner 10. The scanning module 14 further includes a light source 16 for illuminating the document 12 and a CCD 18 for detecting light reflected form the document 12 so as to generate the image data of the document 12. The USB 30 further includes a power rail 32 to provide a power of 2.5 Watts (W). The specification of the power rail 32 is defined by companies including IBM, Intel, Microsoft, NEC, Compaq, DEC, Northern Telecom, etc. and is omitted for simplicity of description.

The scanner 10 is electrically connected to a sufficient power source to ensure the operation of the scanner 10. Normally, a cathode ray tube, employed as the light source 16 of the scanner 10, consumes a power of at least 16 W. In addition, the CCD 18 of the scanner 10, the motor 22 and the control circuit 24 consume powers of 0.5 W, 1.5 W and 0.5 W, respectively. Thus the total consumption of power during the operation of the scanner 10 exceeds the power of 2.5 W provided by the power rail 32 of the USB 30. Consequently, the external power source 20, needing extra space, is needed for the operation of the scanner 10 in addition to the power provided by the power rail 32 of the USB 30.

SUMMARY OF INVENTION

It is therefore a primary object of the claimed invention to provide a charge coupled device (CCD) scanner powered by a serial bus to eliminate a use of an external power source.

According to the claimed invention, the CCD scanner includes a scanning module for generating image data by way of scanning a document, a motor for driving the scanning module, and a control circuit electrically connected to the scanning module and the motor for controlling operations of the scanner. In contrast to the prior art scanner, the CCD scanner is powered only by a serial bus. The CCD scanner further includes a light source with a light emitting diode (LED) tube having at least a light emitting diode (LED), for focusing light radiated from the LID tube on the document.

In another embodiment of the claimed invention, the control circuit of the CCD scanner periodically switches the power provided by the USB to the light source and the motor. The control circuit shuts down the motor when the light source focuses light on the document, and shuts down the light source when the motor drives the scanning module, so as to ensure the power provided by the USB sufficient for the operation of the scanner.

It is an advantage of the claimed invention over the prior art that the power consumption of the scanner during the operation is significantly reduced. In addition, the scanner in the claimed invention is powered only by the power rail the USB. Eternal power sources, requiring extra space, are thus omitted.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
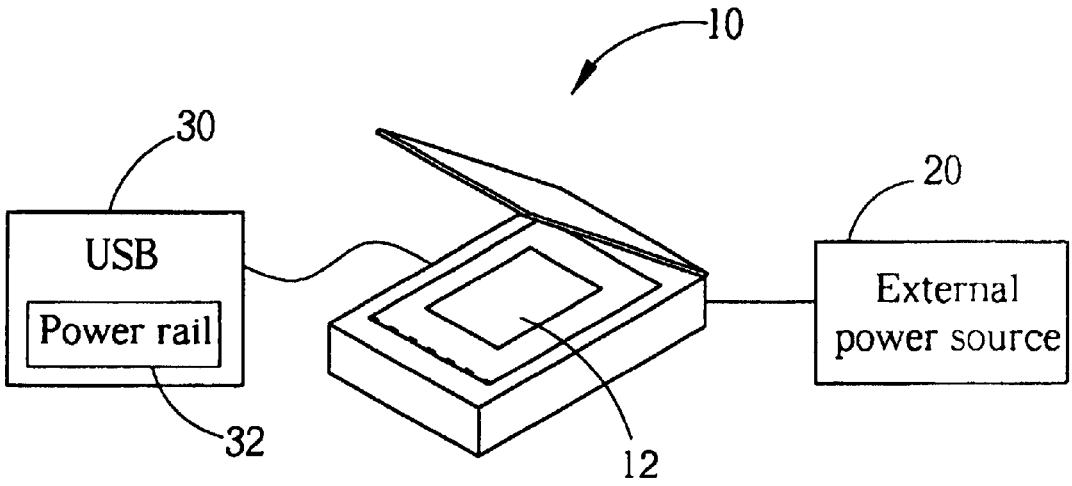
Fig. 1 Prior art
FIG. 1 is a schematic view of a charge coupled device (CCD) scanner electrically connected to both a universal serial bus (USB) and an external power source according to the prior art.
Figure 2:
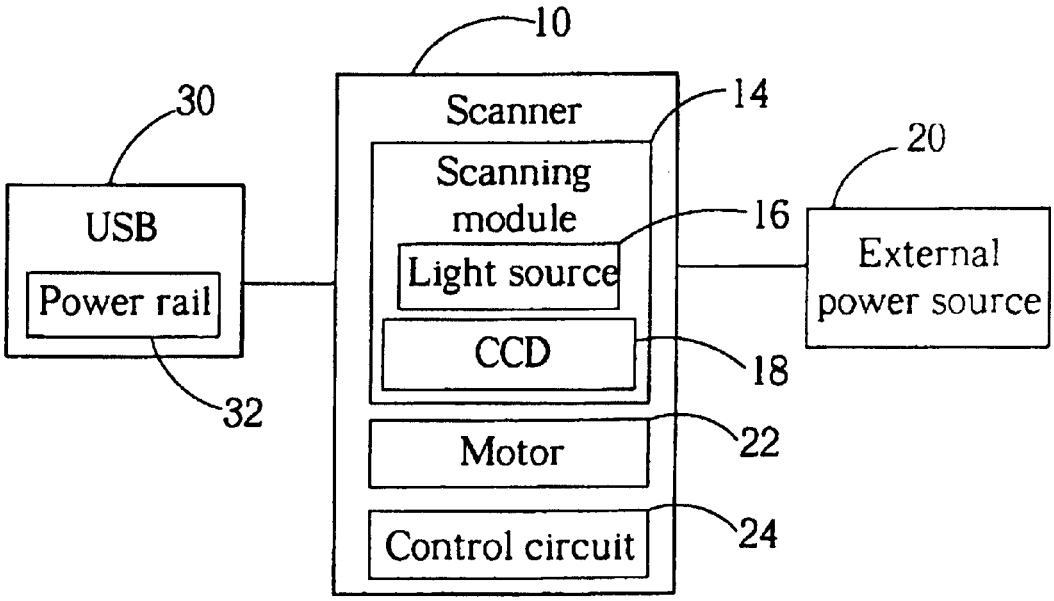
Fig. 2 Prior art
FIG. 2 is a function block diagram of the scanner 10 in FIG. 1.
Figure 3:
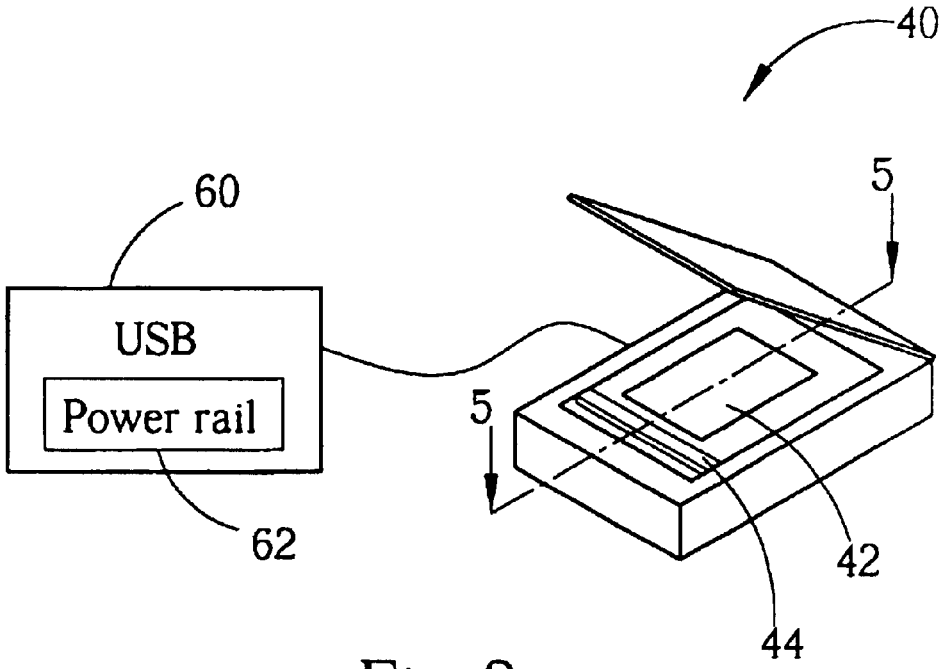
FIG. 3 is the schematic view of the CCD scanner electrically connected to a serial bus according to the present invention.
Figure 4:
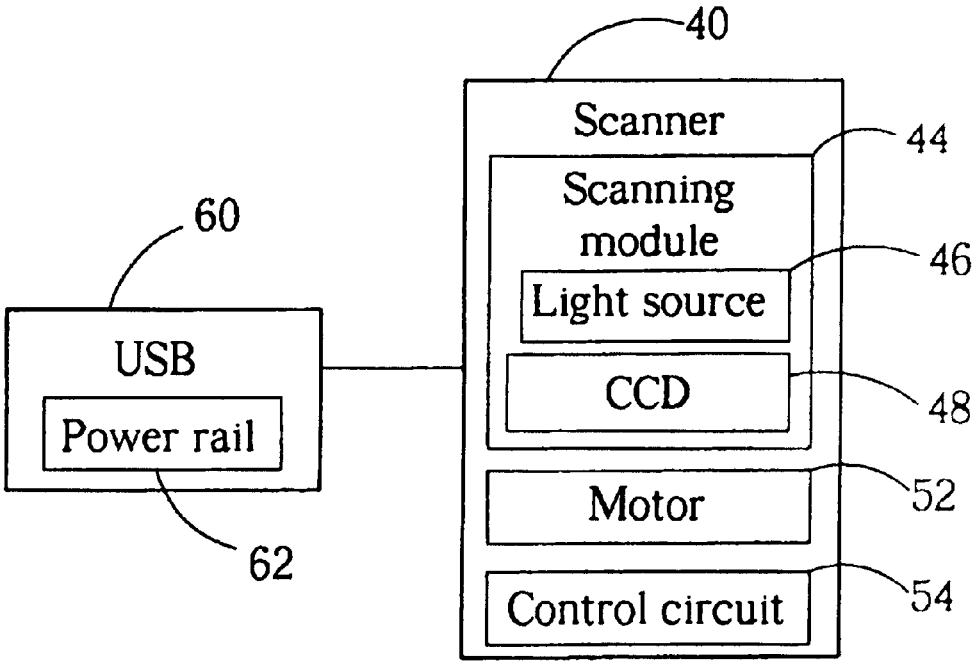
FIG. 4 is the function block diagram of the scanner shown in FIG. 3 according to the present invention.

Please refer to FIG. 3 and FIG. 4. FIG. 3 represents a schematic view of a charge coupled device (CCD) scanner 40 electrically connected to a serial bus 60 according to the present invention. FIG. 4 represents a function block diagram of the scanner 40 according to the present invention. The serial bus 60, including a power rail 62 that provides a power of 2.5 Watts (W), is a universal serial bus (USB), and the scanner 40 is powered only by the power rail 62 of the serial bus 60. As shown in FIG. 3, the scanner 40 includes a scanning module 44 for generating image data by way of scanning a document 42, a motor 52 for driving the scanning module 44, and a control circuit 54 for controlling operations of the scanner 40. The scanning module 44 further includes a light source 46 including a light emitting diode (LED) tube having at least an LED for illuminating the document 42 and for focusing light radiated from the LED tube on the document 42, and a charge coupled device (CCD) 48 for detecting light reflected from the document 42 so as to generate the image data. The LED radiates white light for illuminating the document 42, and the CCD 48 detects the light reflected from the document 42 to generate the image data when the white light illuminates the document 42. In comparison with the power consumption of the cathode ray tube employed in the prior art, the power consumption of the LED tube 46 is only approximately 0.3 W. The LED tube 46 in the present invention is thus a power-saving solution. Alternatively, the serial bus 60 can use an IEEE 1394 architecture.

Since the CCD 48, the motor 52, and the control circuit 54 respectively consume powers of 0.5 W, 1.5 W and 0.5 W, the total power consumption for the operation of the scanner 40 is approximately 2.8 W. In order to reduce the total power consumption of the scanner 40 down to less than 2.5 W, the rotational speed is decreased so that the power consumption of the motor 52 is less than 1.2 W. Although the scanning speed of the scanning module 44 is thus lowered, the scanner 40 is powered only by the power rail 62 of the USB 60 without any external power source.

Figure 5:
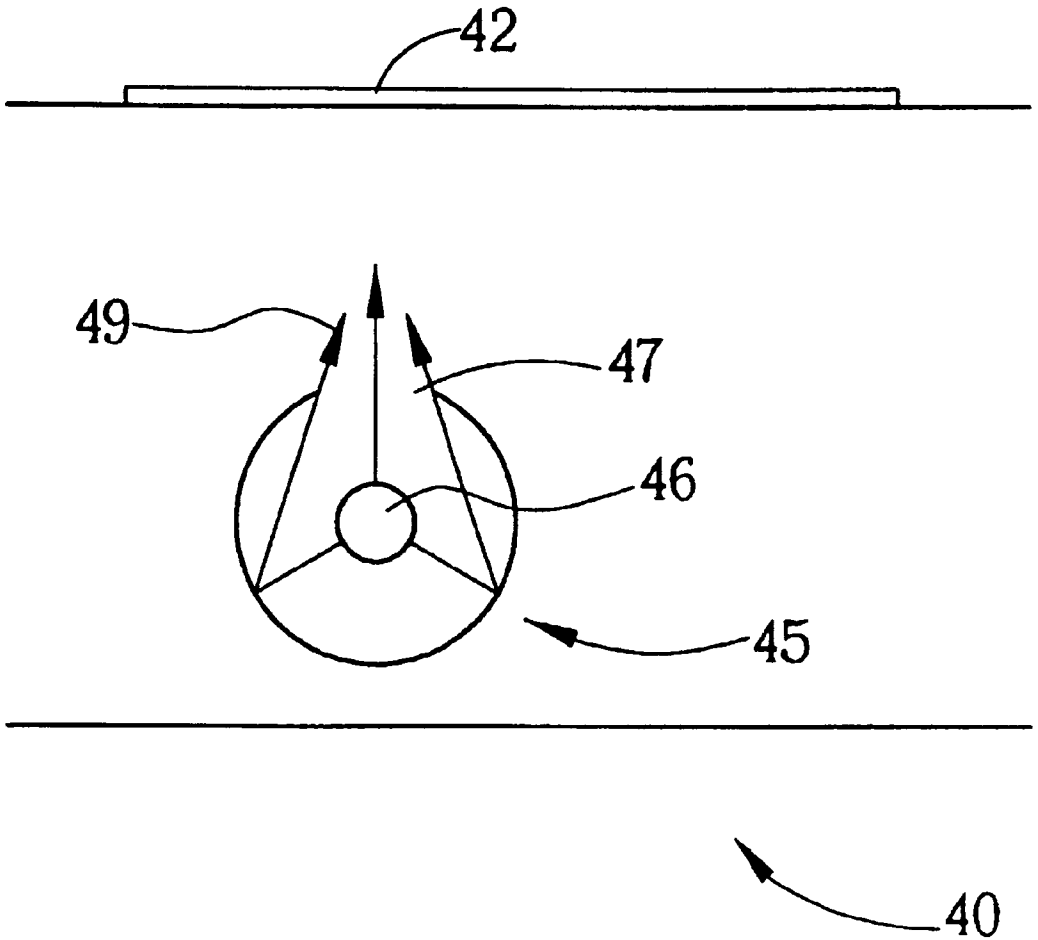
FIG. 5 is a sectional view of the scanner shown in FIG. 3 according to the present invention.

Please refer to FIG. 5 of a sectional view along line 5—5 of the scanner 40 shown in FIG. 3. As shown in FIG. 5, the scanner 40 further includes a spotlight device 45 surrounding the light source 46. Light 49 radiated from the light source 46 is reflected by the inner surface of the spotlight device 45 and focused on the document 42 through a slit 47 positioned on the spotlight device 45.

Figure 6:
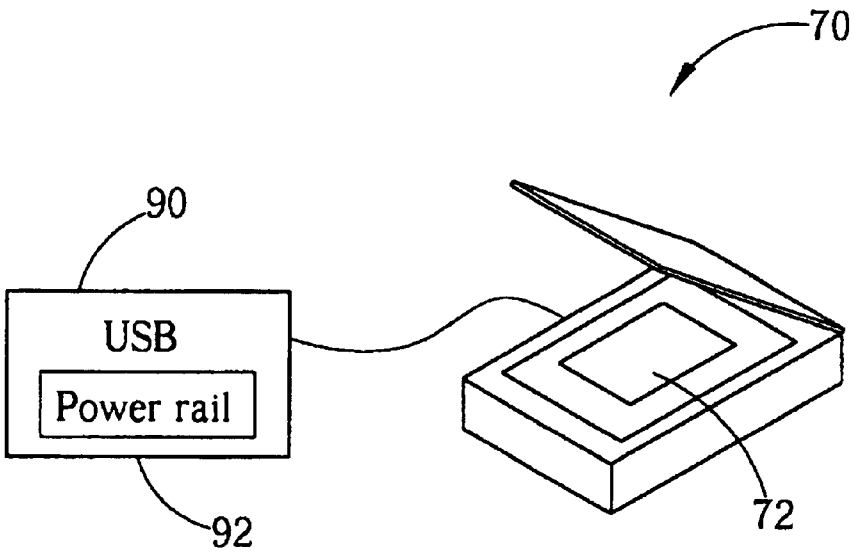
FIG. 6 is the schematic view of a scanner electrically connected to a USB according to another embodiment of the present invention.
Figure 7:
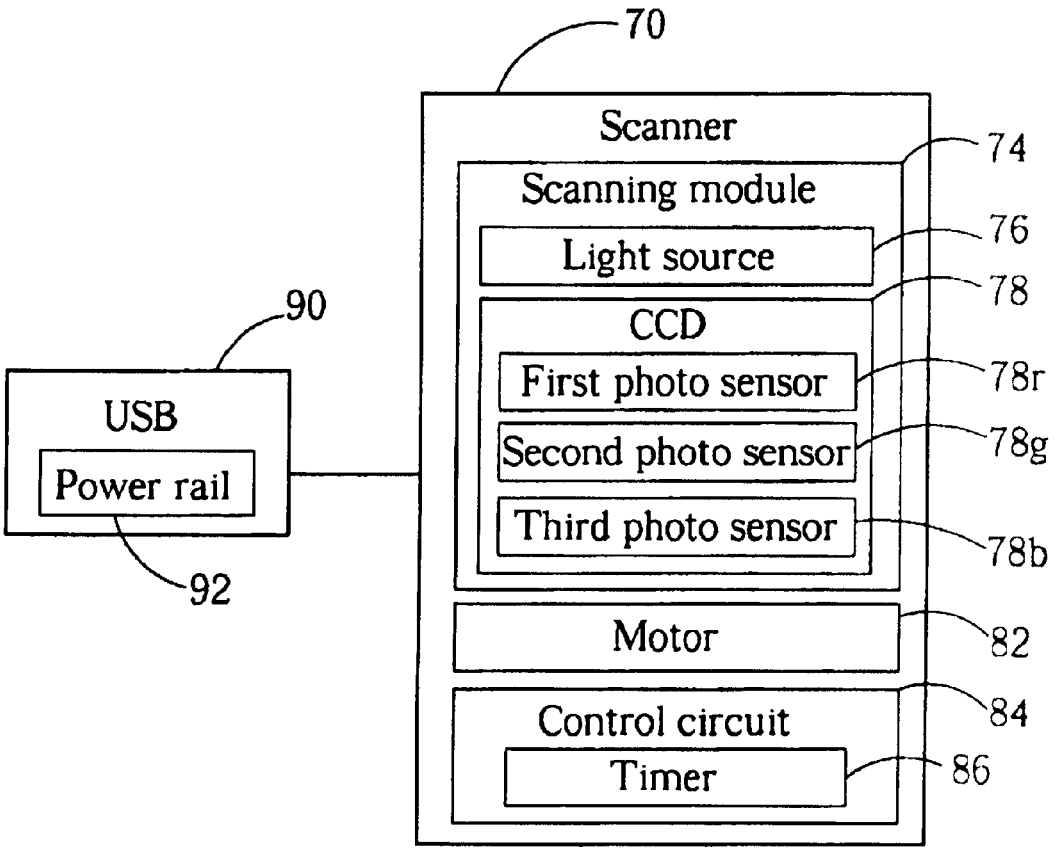
FIG. 7 is the function block diagram of the scanner shown in FIG. 6 according to the present invention.

Please refer to FIG. 6 and FIG. 7. FIG. 6 represents a schematic view of a scanner 70 electrically connected to a USB 90 including a power rail 92 that provides a power of 2.5 W, according to another embodiment of the present invention. FIG. 7 represents a function block diagram of the scanner 70 shown in FIG. 6. As shown in FIG. 6, the scanner 70 includes a scanning module 74 for generating image data by way of scanning a document 72, a motor 82 for driving the scanning module 74, and a control circuit 84 for controlling operations of the scanner 70. The scanning module 74 further includes a light source 76 for focusing light on the document 72, and a CCD 78 for detecting light reflected from the document 72 so as to generate the image data.

The light source 76 is a cathode ray tube that consumes a power of 1.5 W during operation. Additionally, the CCD 78, the motor 82, and the control circuit 84 respectively consume powers of 0.5 W, 1.5 W and 0.5 W. This brings the total power consumption for the operation of the scanner 70 to approximately 4 W, which exceeds the power of 2.5 W provided by the power rail 92 of the USB 90. In order to reduce the total power consumption of the scanner 40 down to 2.5 W, the control circuit 84 is designed to periodically turn on/off the light source 76 and the motor 82. The control circuit 84 shuts down the motor 82 when the light source 76 focuses light on the document 72, so that the total power consumption of the scanner 70 is 2.5 W. When the motor 82 drives the scanning module 74, the control circuit 84 shuts down the light source 76, so that the total power consumption of the scanner 70 is 2.5 W as well. Consequently, the scanner 70 is powered only by the power rail 92 of the USB 90 without any external power source.

Figure 8:
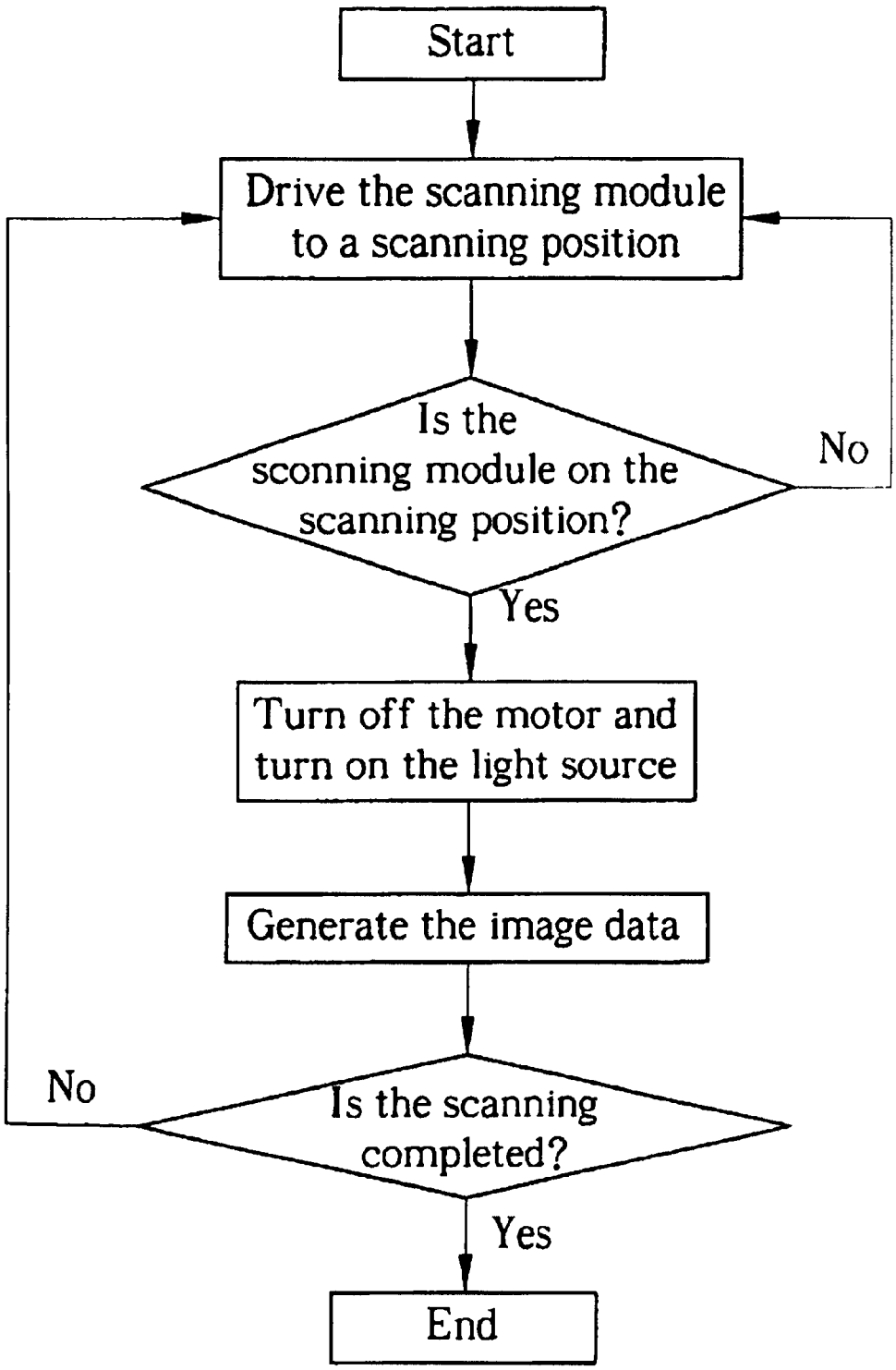
FIG. 8 is a flow chart of the scanner shown in FIG. 6.

Please refer to FIG. 8 of a flow chart of the scanner 70 shown in FIG. 6. As shown in FIG. 8, the control circuit 84 turns off the light source 76 and turns on the motor 82 to drive the scanning module 74 to a scanning position when the scanner 70 starts to scan the document 72. After the scanning module 84 is driven to the scanning position, the control circuit 84 turns off the motor 82 and turns on the light source 76, so that the CCD 78 can detect light reflected from the document 72. The image data of the document 72 is thus generated by the scanning module 74. Then the control circuit 84 once again turns off the light source 76 and turns on the motor 82 to drive the scanning module 74 to the next scanning position until the scanning is complete. By using the control circuit 84 to periodically turn on/off the light source 76 and the motor 82, the scanner is powered only by the power rail 92 of the USB 90 during the operation.

Figure 9:
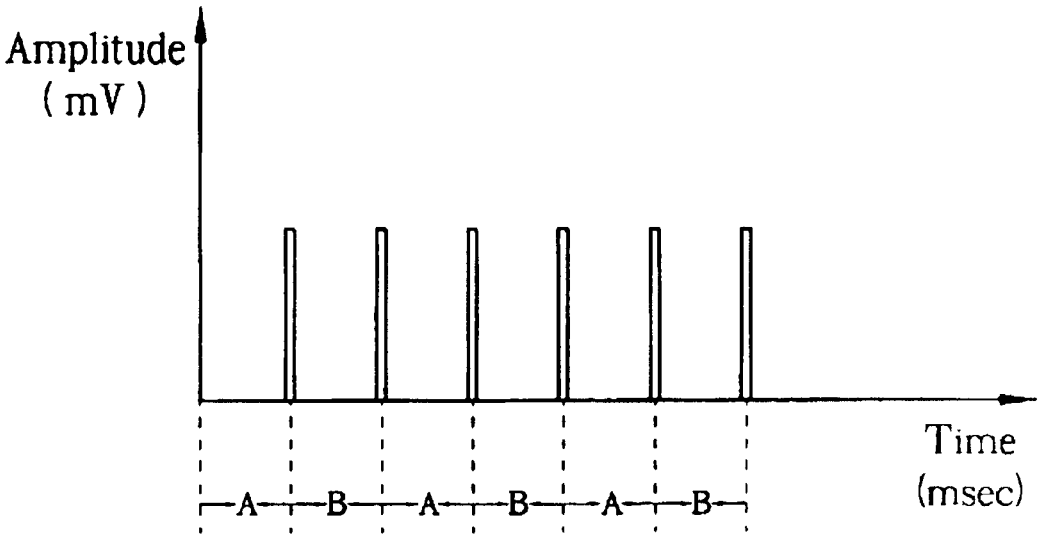
FIG. 9 represents a relationship between the amplitude and the time of a clock signal of a first type generated by a timer of the scanner shown in FIG. 6.

Please refer to FIG. 9, which represents a relationship between the amplitude and the time of a clock signal of a first type generated by a timer 86 of the scanner 70 shown in FIG. 6. As shown in FIG. 7, the control circuit 84 includes the timer 86, and the CCD 78 includes a first photo sensor 78r, a second photo sensor 78g, and a third photo sensor 78b. The first photo sensor 78r, second photo sensor 78g, and third photo sensor 78b are employed for detecting a red beam, a green beam, and a blue beam reflected from the document, respectively, to generate corresponding image data simultaneously. As shown in FIG. 9, the clock signal includes multiple pulses, each pulse having a same predetermined period. The multiple predetermined periods are then determined as multiple alternating periods A and periods B. During the periods A, the control circuit 84 turns off the light source 76, and the motor 82 drives the scanning module 74 to a scanning position. During the periods B, the control circuit 84 turns off the motor 82, and the light source 76 illuminates the document 72 so that the corresponding image data of the document 72 is generated by the scanning module 74. When the light source 76 illuminates the document 72, the first photo sensor 78r, second photo sensor 78g, and third photo sensor 78b detect the three beams reflected from the document 72 simultaneously.

Alternatively, the control circuit 84 can be designed to detect three beams reflected from the document sequentially so as to simplify the design and save manufacturing costs of the scanner 70. In other words, only one of the first photo sensor 78r second photo sensor 78g, and third photo sensor 78b detect one of the three beams reflected from the document 72 in a same period.

Figure 10:
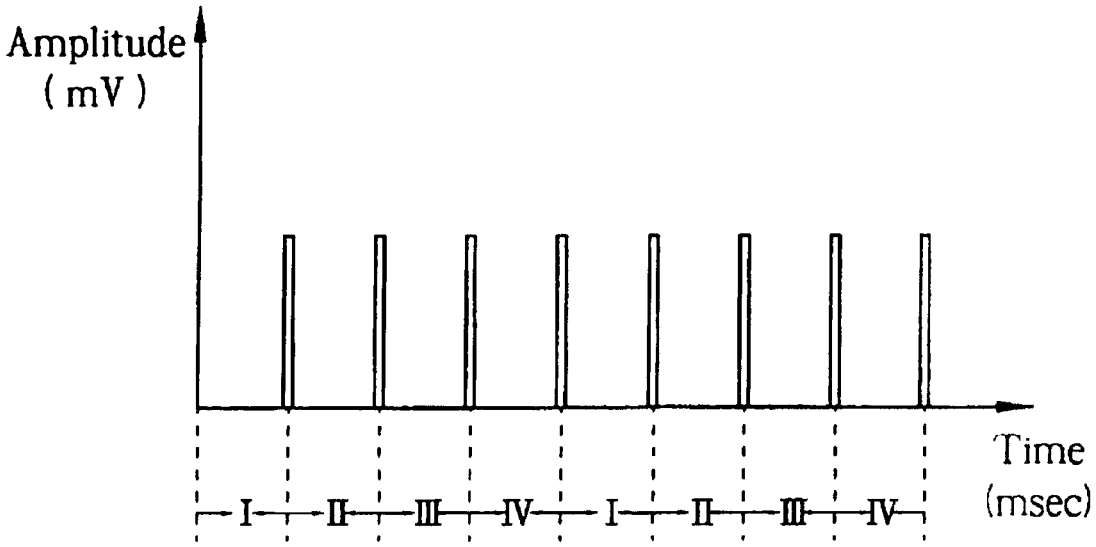
FIG. 10 represents a relationship between the amplitude and the time of a clock signal of a second type generated by the timer of the scanner shown in FIG. 6.

Please refer to FIG. 10, which represents a relationship between the amplitude and the time of a clock signal of a second type generated by the timer 86 of the scanner 70 shown in FIG. 6. As shown in FIG. 10, the multiple predetermined periods are determined as multiple periods I, multiple periods II, multiple periods III, and multiple periods IV. During the periods I, the control circuit 84 turns off the light source 76 and the motor 82 drives the scanning module 74 to a scanning position. During the periods II, III, and IV, the control circuit 84 turns off the motor 82, and the light source 76 illuminates the document 72. By using the control circuit 84, the operation of the scanner 70 is thus powered only by the USB 90. In addition, the control circuit 84 controls the CCD 78 so that only the first photo sensor 78r detects the red beam reflected from the document 72 and generates the corresponding image data of the document 72 during the periods II. Only the second photo sensor 78g detects the green beam reflected from the document 72 and generates the corresponding image data of the document 72 during the periods III. Likewise, only the third photo sensor 78b detects the blue beam reflected from the document 72 and generates the corresponding image data of the document 72 during the periods IV. A final image data is then obtained by combining corresponding image data generated by the first photo sensor 78r, second photo sensor 78g and third photo sensor 78b. In addition, the scanner 40 in the preferred embodiment of the present invention can also be designed to include three photo sensors as the CCD 78 does, so that the control circuit 54 can control the three photo sensors to detect the three beams reflected from the document 42 either simultaneously or sequentially.

Figure 11:
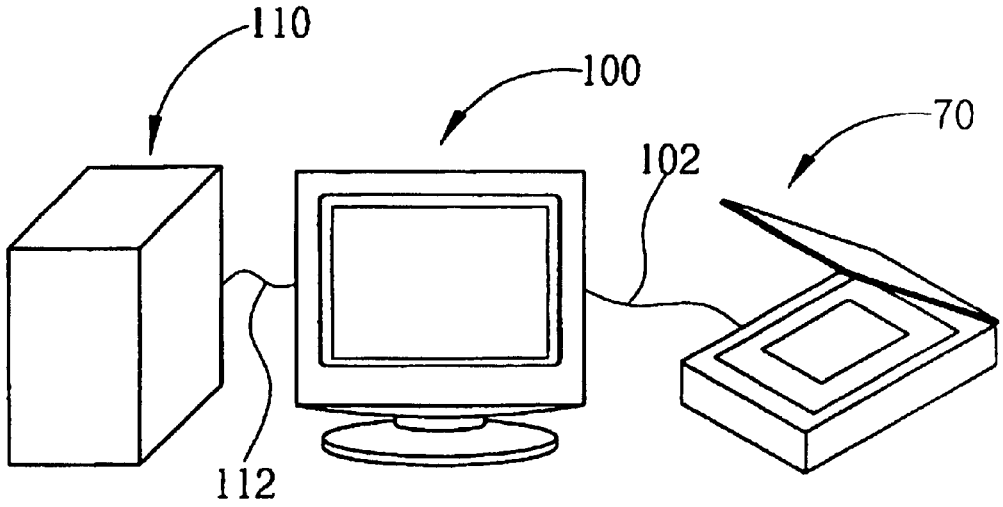
FIG. 11 is the schematic view of the scanner shown in FIG. 6 electrically connected to a display and a computer according to the present invention.
Figure 12:
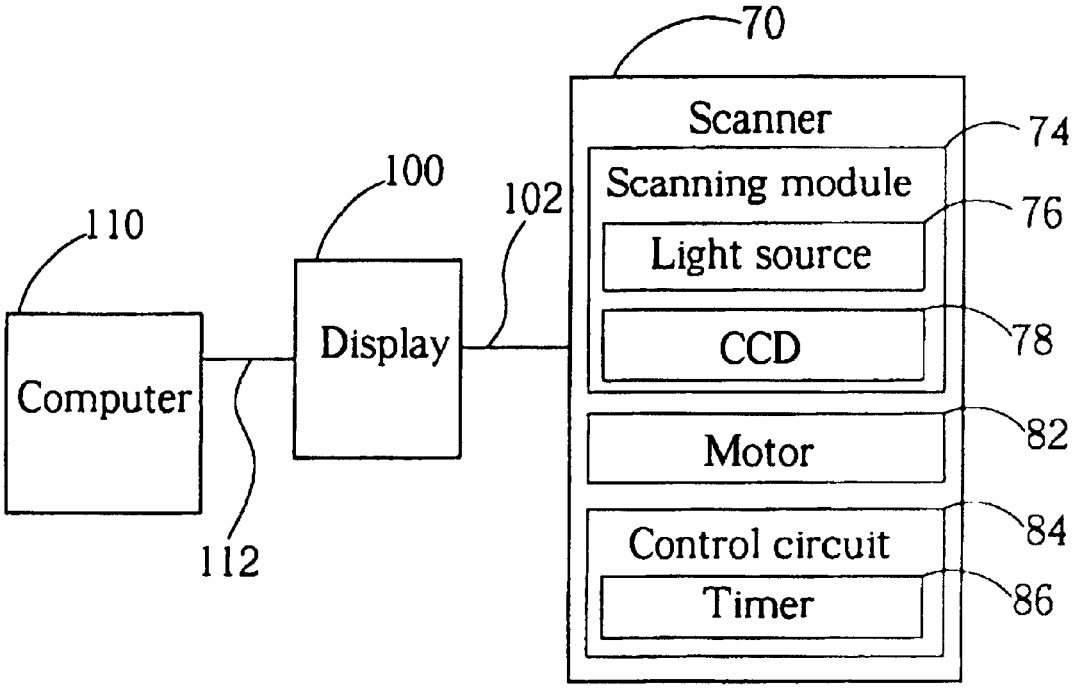
FIG. 12 is the function block diagram of the scanner shown in FIG. 11.

Please refer to FIG. 11 and FIG. 12. FIG. 11 represents the schematic view of the scanner 70 shown in FIG. 6 electrically connected to a display 100 and a computer 110 according to the present invention. FIG. 12 represents a function block diagram of the scanner 70 shown in FIG. 11. As shown in FIG. 11 and FIG. 12, the scanner 70 is connected to the display 100 and the computer 110 respectively via a USB 102 and a USB 112, and powered only by the USB 102 without any external power sources. Comparably, the scanner 40 in the preferred embodiment of the present invention can be respectively connected to the display 100 and the computer 110 via the USB 102 and the USB 112 as well, and powered only by the USB 102 without any external power sources.

Alternatively, the light source 76 can be replaced by the LED tube, and the spotlight device 45 shown in FIG. 5 can be added into the scanner 70 to focus the light radiated from the LED tube on the document 72 so as to further reduce the power consumption of the scanner 70 during the operation. The USB 102 can be replaced by IEEE 1394 architecture as well.

In comparison with the scanner 10 in the prior art, the scanners 40 and 70 provided in the present invention are powered respectively by the power rail 62 of the USB 60 and the power rail 92 of the USB 90 only. External power sources, requiring extra space, are thus omitted. In addition, the power consumption of the scanners 40 and 70 during the operation is reduced as well.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A scanner comprising:

a scanning module for generating image data by way of scanning a document, the scanning module comprising:

a light source for illuminating the document; and a charge coupled device (CCD) for detecting light reflected from the document so as to generate the image data;

a motor for driving the scanning module; and a control circuit electrically connected to the scanning module and the motor for controlling operations of the scanner;

wherein the scanner is only powered by a serial bus, the control circuit turns off the motor when the light source illuminates the document, and the control circuit turns off the light source when the motor drives the scanning module.

2. The scanner of claim 1 further comprising a timer for generating a clock signal, wherein the control circuit switches power of the serial bus between the light source and the motor periodically according to the clock signal.

3. [A] The scanner of claim 1 wherein the light source is a cathode ray tube.

4. The scanner of claim 1 wherein the light source is a light emitting diode tube (LED tube) which has at least a light emitting diode (LED) for radiating light.

5. The scanner of claim 4 wherein the LED radiates white light for illuminating the document, and the charge coupled device detects the light reflected from the document to generate the image data when the white light illuminates the document.

6. The scanner of claim 4 further comprising a spotlight device for focusing light radiated from the LED tube on the document.

7. The scanner of claim 1 wherein when the LED tube illuminates the document, the charge coupled device detects three beams reflected from the document simultaneously.

8. The scanner of claim 7 wherein the three beams are a red beam, a green beam, and a blue beam, and the charge coupled device has a first photo sensor, a second photo sensor, and a third photo sensor for detecting the red beam, the green beam, and the blue beam, respectively, to generate corresponding image data.

9. The scanner of claim 1 wherein when the LED tube illuminates the document, the charge coupled device detects three beams reflected from the document sequentially.

10. The scanner of claim 9 wherein the three beams are a red beam, a green beam, and a blue beam, the charge coupled device has a first photo sensor, a second photo sensor, and a third photo sensor, and the control circuit controls the first photo sensor, the second photo sensor, and the third photo sensor by turns, so that the first photo sensor detects the red beam, the second photo sensor detects the green beam, and the third photo sensor detects the blue beam, so as to generate corresponding image data.

11. The scanner of claim 1 wherein the scanner is electrically connected to a computer via the serial bus.

12. The scanner of claim 1 wherein the serial bus uses a universal serial bus (USB) architecture or an IEEE 1394 architecture.

*13. A scanner comprising:*

*a scanning module having a light source and a sensor disposed thereon;*

*a motor adapted to drive the scanning module; and*

*a control circuit electrically coupled to the scanning module and the motor, wherein the light source, the sensor, the motor and the control circuit are powered by a serial bus, and the control circuit is adapted to toggle power between the motor and the light source during a scanning operation.*

*14. The scanner of claim 13, further comprising a timer for generating a clock signal, wherein the control circuit is adapted to toggle power between the motor and the light source according to the clock signal.*

*15. The scanner of claim 13, wherein the light source comprises a cathode ray tube.*

*16. The scanner of claim 13, wherein the light source comprises a plurality of light emitting diodes (LED).*

*17. The scanner of claim 13, wherein the sensor comprises a charge coupled device (CCD).*

*18. The scanner of claim 13, wherein the serial bus complies with one of a universal serial bus (USB) architecture or IEEE 1394 architecture.*

*19. A scanner comprising:*

*a scanning module having a light source and a sensor disposed thereon;*

*a motor adapted to drive the scanning module; and*

*a control circuit electrically coupled to the scanning module and the motor, and the control circuit is adapted to toggle power between the motor and the light source during a scanning operation.*

*20. The scanner of claim 19, further comprising a timer for generating a clock signal, wherein the control circuit is adapted to toggle power between the motor and the light source according to the clock signal.*

*21. The scanner of claim 19, wherein the light source comprises a cathode ray tube.*

*22. The scanner of claim 19, wherein the light source comprises a plurality of light emitting diodes (LED).*

*23. The scanner of claim 19, wherein the sensor comprises a charge coupled device (CCD).*

*24. A method, comprising:*

*synchronously altering the power provided to a motor and a light source of a scanning module, wherein the altering comprises reducing power to one of the motor and the light source while increasing power to the other one of the motor and the light source substantially in accordance with a clock signal.*

*25. The method of claim 24, wherein the altering comprises toggling the power between the motor and the light source.*

*26. The method of claim 24, wherein the altering comprises reducing power to the motor while the power to the light source is cycled on.*

*27. The method of claim 24, wherein the altering is substantially performed by a control circuit electrically coupled to the scanning module and the motor.*

*28. The method of claim 24, wherein the light source comprises a cathode ray tube.*

*29. The method of claim 24, wherein the light source comprises a plurality of light emitting diodes (LED).*

*30. The method of claim 24, wherein the power is provided to a motor and a light source by use of a serial bus.*

*31. The method of claim 30, wherein the serial bus complies with one of a universal serial bus (USB) architecture or IEEE 1394 architecture.*

* * * * *